United States Patent [19]

Ishii et al.

[11] Patent Number: 4,885,691

[45] Date of Patent: Dec. 5, 1989

[54] MICROCOMPUTER APPLIED CONTROL UNIT FOR USE IN A VEHICLE

[75] Inventors: Mitsuaki Ishii; Masaaki Miyazaki; Takahiro Matsunaga, all of Hyogo, Japan

[73] Assignee: Mitsubishi Denki Kabushiki Kaisha, Tokyo, Japan

[21] Appl. No.: 124,519

[22] Filed: Nov. 24, 1987

[30] Foreign Application Priority Data

Nov. 24, 1986 [JP] Japan ................................ 61-280408

[51] Int. Cl.[4] ................................................ G06F 13/00

[52] U.S. Cl. ............................ 364/424.04; 364/424.01

[58] Field of Search ..................... 364/424.04, 200, 900

[56] References Cited

U.S. PATENT DOCUMENTS 4,628,480 12/1986 Floyd ................................ 364/900

*Primary Examiner*—Parshotam S. Lall

*Assistant Examiner*—V. N. Trans

*Attorney, Agent, or Firm*—Sughrue, Mion, Zinn, Macpeak & Seas

[57] ABSTRACT

The microcomputer applied control unit for use in a vehicle comprises digital data input device for setting a data direction register immediately before the digital data is read via an I/O port, and storage for storing the data thus inputted by the digital data input device.

4 Claims, 3 Drawing Sheets

MICROCOMPUTER APPLIED CONTROL UNIT FOR USE IN A VEHICLE

BACKGROUND OF THE INVENTION

The present invention relates to a microcomputer applied control unit for use in a motor vehicle.

FIG. 1 shows a general configuration of a conventional microcomputer, which comprises a Read Only Memory (ROM) 1 in which instruction codes and data are stored, a Central Processing Unit (CPU) 2 for sequentially processing the instructions stored in the ROM 1, an I/O (Input/Output) port 3 for inputting digital data 104 and outputting a signal to a controlled system 105, a Data Direction Register (DDR) 4 for setting the input/output direction of the I/O port 3, a Random Access Memory (RAM) 5 to or from which the CPU 2 is capable of writing or reading data, a stack pointer 6, and a programmable timer 7.

The CPU 2, ROM 1, I/O port 3, DDR 4, RAM 5 stack pointer 6 and programmable timer 7 are adapted to receive and give data with one another. The I/O port 3 outputs data to the controlled system 105.

Generally, the input/output direction of the I/O port 3 is set once in an initial setting step if the input/output direction should not be changed, as described in the Integrated Circuit Catalog of Fujitsu, Ltd. No. GD-001050-2C, p. 213.

A description will be given to instruction programs stored in the ROM 1. FIG. 2 shows an essential flowchart of the executive routine of a conventional control program. According to the control program shown in FIG. 2, the stack pointer 6 and the programmable timer 7, for example, together with the DDR 4 are initially set at a STEP 31.

At STEP 32 where input data is needed, the input data is directly read from the I/O port 3 and utilized for operational processing at STEP 33.

At STEP 34 where input data is again needed, the input data is again read from the I/O port 3 and utilized for operational processing in STEP 35, in the same manner practiced in STEP 32.

In the afore-mentioned system of the conventional control program execution, the DDR 4 is set up once in the initial setting STEP 31 and not reset during the postprocessing.

In that case, the contents of the DDR 4 may alter for some reason, e.g., noise, and the input/output direction of the I/O port 3 may also change when the contents of the DDR 4 are altered after the initial setting is completed at STEP 31 in the processing routine. Therefore, such a system is disadvantageous in that the digital data 104 cannot be read accurately.

SUMMARY OF THE INVENTION

The present invention is made to eliminate such problems as described above, and it is therefore an object of the invention to provide a microcomputer applied control unit, the control capability of which is unaffected even when the contents of a DDR are altered due to noise or the like.

The microcomputer applied control unit for use in a vehicle according to the present invention comprises digital data input means for setting a data direction register immediately before the digital data is read via an I/O port, and storage means for storing the data thus inputted by the digital data input means.

According to the present invention, the data direction register can be reset immediately before the digital data is read and, therefore, even when the contents of the data direction register are changed due to noise or the like, possibilities for wrong data to be read are minimized.

DETAILED DESCRIPTION OF THE INVENTION

Referring now to the accompanying drawings, a microcomputer applied control unit embodying the present invention will be described as follows.

Figure 3:
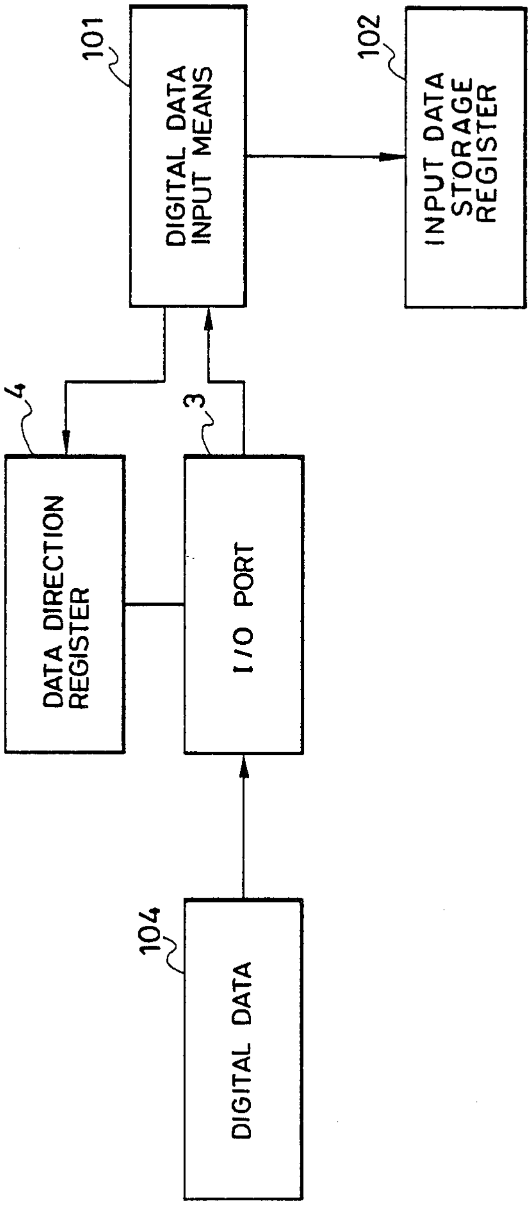
FIG. 3 is a block diagram of a microcomputer applied control unit for use in a vehicle embodying the present invention.

FIG. 3 shows a block diagram of an embodiment of the present invention. In FIG. 3, like reference characters are given to like component parts of FIG. 1.

Figure 1:
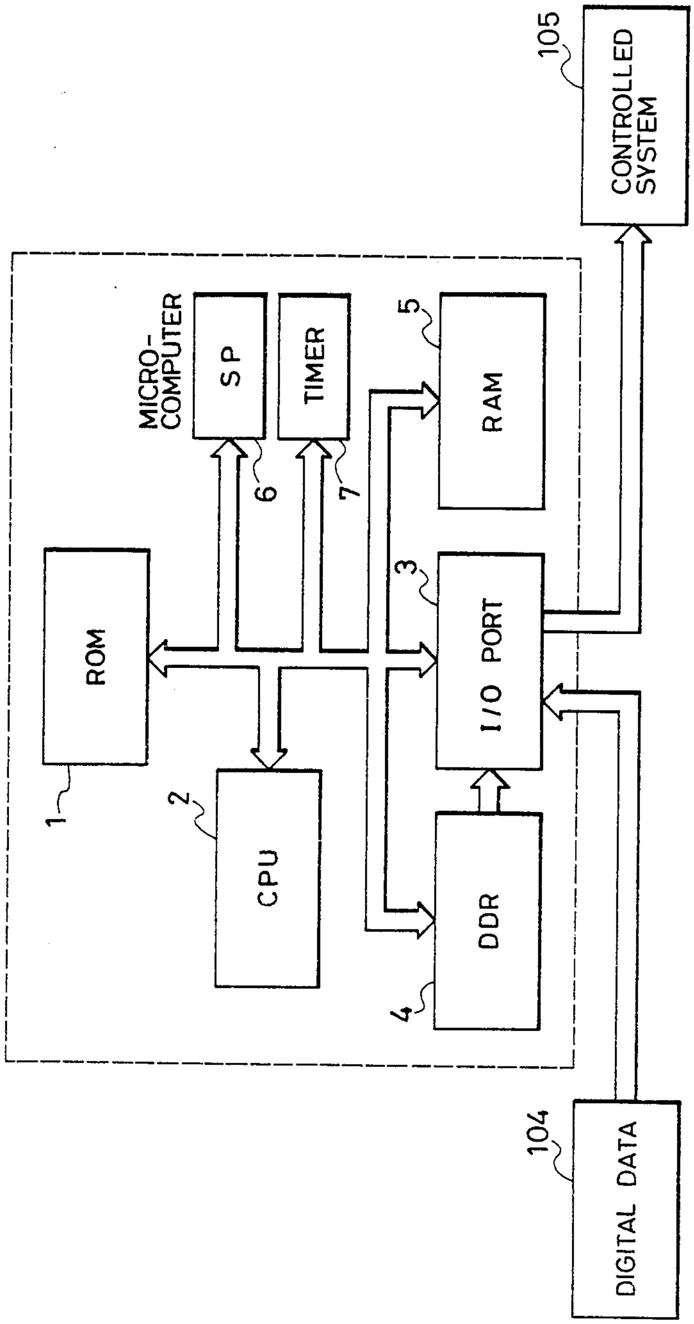
FIG. 1 is a block diagram showing a conventional microcomputer.

As shown in FIG. 3, component parts referred to as 101, 102 have been added to the configuration of FIG. 1. More specifically, a DDR 4 is set up by digital data input means 101 immediately before digital data 104 is read via an I/O port 3. The data inputted by the digital data input device 101 is stored in an input data storage register 102 provided in a RAM 5 shown in FIG. 1. The contents of the input data storage register are utilized for operational processing until the contents thereof are updated next time. The remaining configuration is the same as what is shown in FIG. 1.

Figure 4:
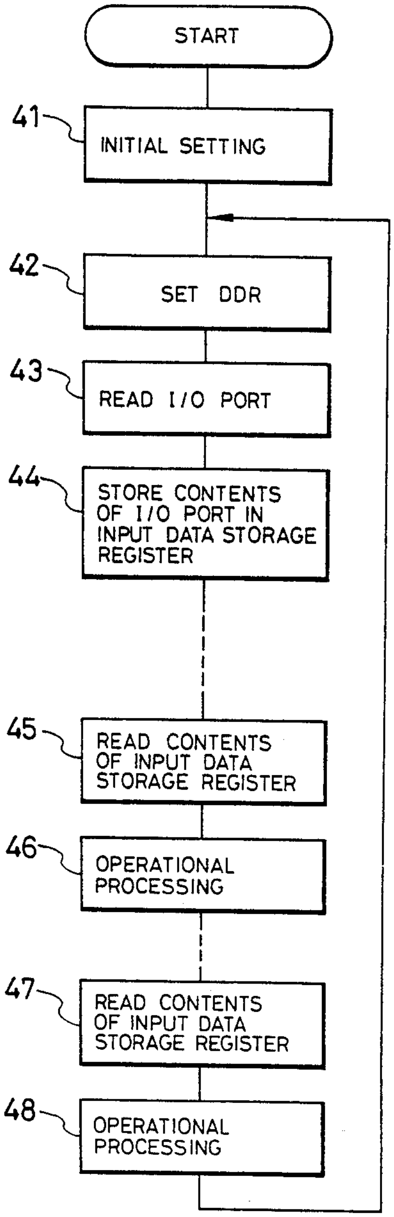
FIG. 4 is a flowchart illustrating the operation of the microcomputer applied control unit of FIG. 3.

Referring to FIG. 4, the operation of the microcomputer applied control unit thus arranged will be described. FIG. 4 shows a flowchart illustrating the operation of the control unit according to the present invention.

Figure 2:
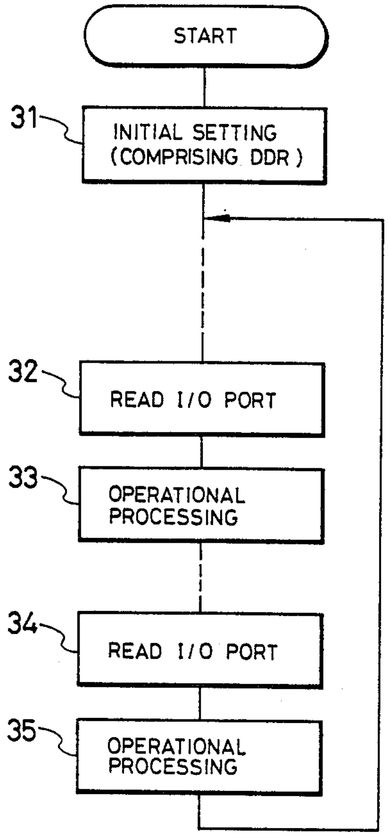
FIG. 2 is an essential flowchart of a conventional microcomputer control program.

Since the operation at STEP 41 is the same as that at the STEP 31 shown in FIG. 2 with the exception that the DDR 4 is not set, the description thereof will be deleted.

The main routine starts from STEP 42, wherein the DDR 4 is set up.

At STEP 43, subsequently, a CPU 2 reads the digital data 104 via the I/O port 3 corresponding to the DDR 4 set up at STEP 42.

At STEP 44, the data read at STEP 43 is then stored in the input data storage register provided in the RAM 5.

At STEP 45, the contents of the input data storage register set up at STEP 44 are read therefrom and utilized for operational processing at the following processing STEP 46.

In the same manner, the contents of the input data storage register are read out therefrom each time the contents thereof are needed until one cycle of the main routine is completed (STEP 47) and utilized for operational processing (STEP 48).

When the one cycle of the main routine is completed, the flow of the process branches off to the beginning of the main routine and the contents of the input data storage register are updated at STEPs 42 to 44, so that the process is repeated in the same manner.

As set forth above, the digital data is stored in the input data storage register via the I/O port immediately after the DDR is set up and the contents of the input data storage register are utilized for operational processing. Accordingly, since the input data is correctly read even when the contents of the DDR are altered due to noise or the like, the system minimizes the possibility of causing malfunction to the control unit as the result of wrong data input.

What is claimed is:

1. A microcomputer applied control unit for a vehicle, comprising:

an input/output port for reading and writing data;

a data direction register for setting the input/output direction of said input/output port;

a read only memory for storing instructions;

a central processing unit for sequentially processing instructions stored in said read only memory;

digital data input means for setting said data direction register each time and immediately before said digital data input means reads digital data via said input/output port; and an input data storage register for storing the data inputted by said digital data input means via said input/output port for operational processing by said central processing unit.

2. The microcomputer applied control unit as defined in claim 1, wherein all of the input data necessary for a processing cycle is read by said digital data input means and stored in said input data storage register before said central processing unit performs operational processing, and wherein said central processing unit reads the input data stored in said input data storage register during the processing cycle.

3. The microcomputer applied control unit as defined in claim 1, further comprising a controlled system for receiving control signals via said input/output port.

4. The microcomputer applied control unit as defined in claim 3, wherein said input/output port, said data direction register, said read only memory, said central processing unit, said digital data input means and said input data storage register constitute a microcomputer.

* * * * *